(12) United States Patent
Hall et al.

(10) Patent No.: US 10,113,690 B1
(45) Date of Patent: Oct. 30, 2018

(54) OVERHEAD MOUNTING SYSTEM FOR DAISY-CHAINED DEVICES

(71) Applicants: David R. Hall, Provo, UT (US); Joe Fox, Spanish Fork, UT (US); Jerome Miles, Spanish Fork, UT (US)

(72) Inventors: David R. Hall, Provo, UT (US); Joe Fox, Spanish Fork, UT (US); Jerome Miles, Spanish Fork, UT (US)

( * ) Notice: Subject to any disclaimer, the term of this patent is extended or adjusted under 35 U.S.C. 154(b) by 27 days.

(21) Appl. No.: 15/488,860

(22) Filed: Apr. 17, 2017

(51) Int. Cl.
*F16M 13/02* (2006.01)
*F16B 1/00* (2006.01)
*B25H 3/02* (2006.01)

(52) U.S. Cl.
CPC ............. *F16M 13/027* (2013.01); *B25H 3/02* (2013.01); *F16B 1/00* (2013.01); *F16B 2001/0035* (2013.01)

(58) Field of Classification Search
CPC ........... F16M 13/027; B25H 3/02; F16B 1/00; F16B 2001/0035
See application file for complete search history.

(56) References Cited

U.S. PATENT DOCUMENTS

| | | | | |
|---|---|---|---|---|
| 1,793,035 A | * | 2/1931 | Whitney | A47B 61/003 211/123 |
| 1,793,036 A | * | 2/1931 | Whitney | A47B 57/26 211/123 |
| 3,338,599 A | * | 8/1967 | Hallman | H02G 3/0608 138/158 |
| 3,541,224 A | * | 11/1970 | Joly | H01R 25/162 174/494 |
| 3,718,307 A | * | 2/1973 | Albanese | F16L 3/00 248/57 |
| 6,519,791 B2 | * | 2/2003 | Randolph | E03C 1/021 4/695 |
| 7,651,056 B2 | * | 1/2010 | Tjerrild | F16L 3/133 248/58 |
| 2003/0043005 A1 | * | 3/2003 | Snider | A47L 13/40 335/284 |

* cited by examiner

*Primary Examiner* — Anita M King

(57) ABSTRACT

The struggle to organize many tools and miscellaneous items of greatly varying shapes and sizes has led to some innovation in garage storage systems. However, most systems are based on the similar concept of creating an overhead floor on which to store things. This is frequently inconvenient and/or inadequate. Accordingly, a garage organization solution is presented herein. The solution comprises an overhead mounting system. The system may include a channel, a device mount for light-weight devices, and a device mount for heavy-weight devices. The light-weight device mount may be detachable from a corresponding light-weight device. The heavy-weight device mount may be integrated into a corresponding heavy-weight device.

18 Claims, 12 Drawing Sheets

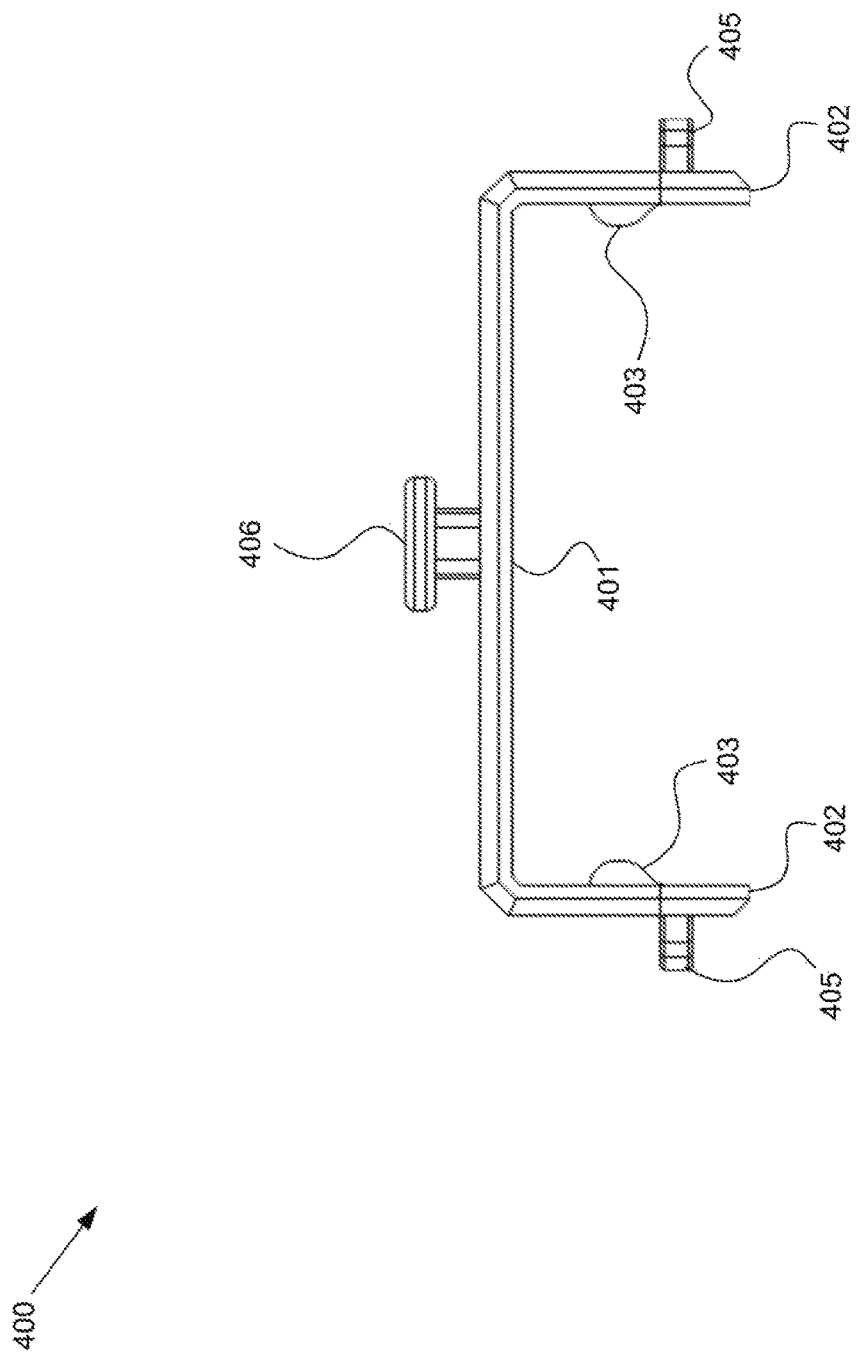

OVERHEAD MOUNTING SYSTEM FOR DAISY-CHAINED DEVICES

TECHNICAL FIELD

This invention relates generally to the field of overhead mounting systems.

BACKGROUND

Garage organization is, for some, the bane of homeownership. The struggle to organize many tools and miscellaneous items of greatly varying shapes and sizes has led to some innovation in garage storage systems. However, most systems are based on the similar concept of creating an overhead floor on which to store things. This may be convenient for items that are not frequently used, but is sorely inadequate for items that are frequently accessed, especially for tools. Tools may be stored in more convenient, ground-based boxes or in cabinets, but this may be inconvenient for regularly used tools such as power cords, speakers, compact lifters, and lights, among others. It may be convenient to store such tools in an out-of-the-way location and still have ready access to them. Such a need is amplified by the fact that remote control of such tools is becoming more common. Thus, there is room for improvement in garage organization solutions.

SUMMARY OF THE INVENTION

Embodiments of an overhead mounting system are described herein that address at least some of the problems described above in the Background. Various embodiments may include a channel, a first device mount, and a second device mount. The channel may include a base. The channel may include at least two opposing walls fixed to the base. The opposing walls may extend from the base. The opposing walls may each include a plurality of openings. Opposing openings may be coaxial. The first device mount may be detachable from a corresponding light-weight device. The first device mount may be detachably connected to the channel, such as by two or more detents. The detents may be disposed in at least two of the coaxial opposing openings. The light-weight device may have a weight ranging from one ounce to 10 pounds. The second device mount may be integral with a corresponding heavy-weight device. The second device mount may be detachably connected to the channel, such as by one or more rods passing through at least two of the coaxial opposing openings.

BRIEF DESCRIPTION OF THE DRAWINGS

A more particular description of the system summarized above is made below by reference to specific embodiments. Several embodiments are depicted in drawings included with this application, in which:

FIGS. 4A-C depict various views of a light-weight device mount;

DETAILED DESCRIPTION

Figure 1A:
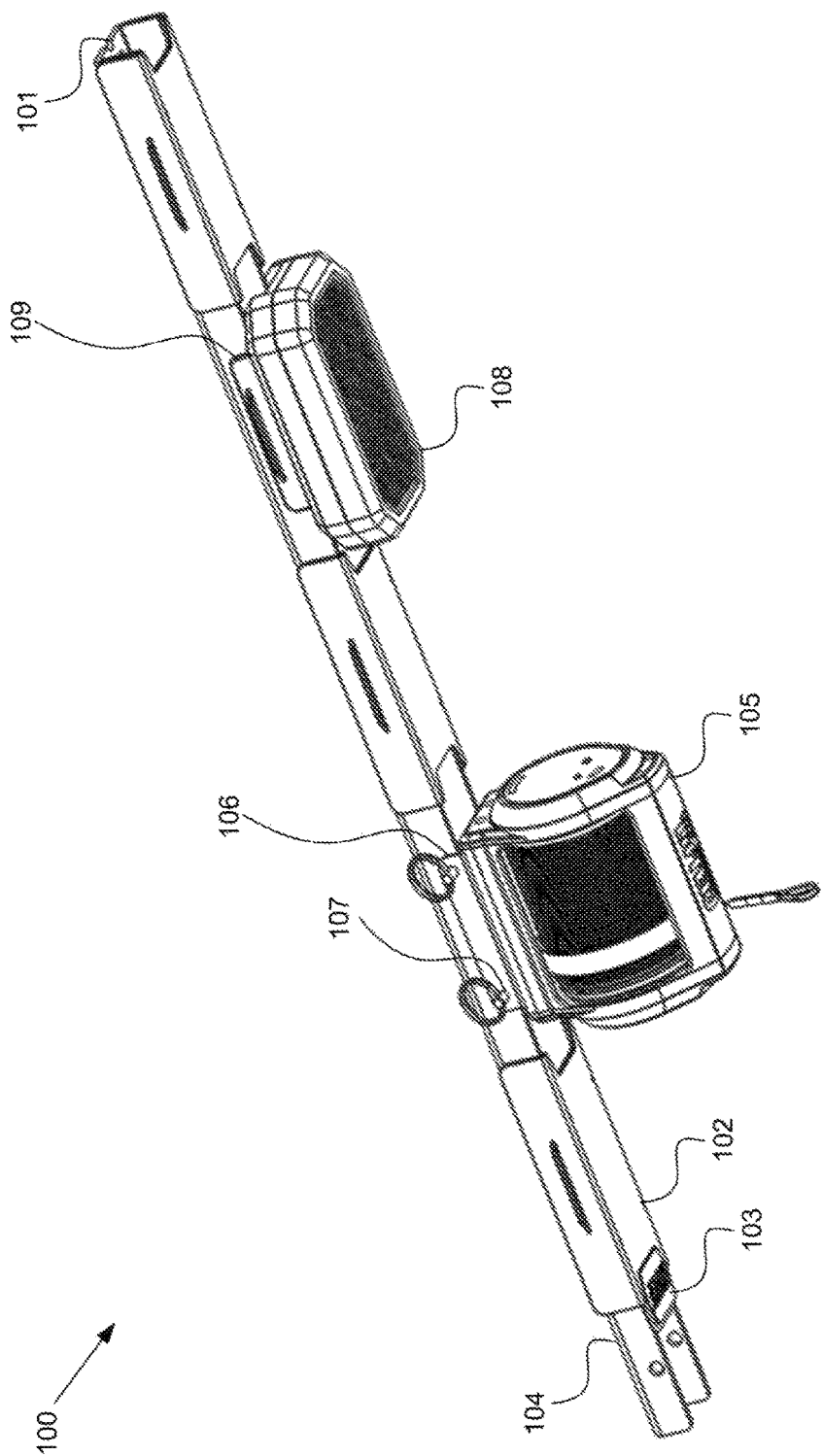
FIGS. 1A-B depict two views of an overhead mounting system.

A detailed description of embodiments of an overhead mounting system is provided below by example, with reference to embodiments in the appended figures. Those of skill in the art will recognize that the features of the system as described below and as depicted and described by example in the figures below could be arranged and designed in a wide variety of different configurations. Thus, the detailed description of the embodiments and in the figures is merely representative of embodiments of the invention, and is not intended to limit the scope of the invention as claimed.

Various embodiments of the overhead mounting system may include a channel, a first device mount, and a second device mount. As used herein, "device mount" may refer generically to the first and/or the second device mount, such as in describing features shared by the first and second device mount. The channel may include a base, walls, and two or more opposing ends. The channel may include at least two opposing walls fixed to the base. The opposing walls may extend from the base. The opposing walls may each include a plurality of openings. Opposing openings may be coaxial. The first device mount may be detachable from a corresponding light-weight device. The first device mount may be detachably connected to the channel, such as by two or more detents. The detents may be disposed in at least two of the coaxial opposing openings. The light-weight device may have a weight ranging from one ounce to 10 pounds. The second device mount may be integral with a corresponding heavy-weight device. The second device mount may be detachably connected to the channel, such as by one or more rods passing through at least two of the coaxial opposing openings. The second device mount may support a weight ranging from five pounds to 200 pounds.

The channel may be used to mount one or more devices to a surface. The surface may include an overhead surface such as a ceiling, a wall, or a floor. The channel may accommodate wiring for the devices. The devices may be daisy-chained by wiring running along the channel. Covers may support and/or hide the wiring. The channel and/or one or more of the device mounts may be comprised one or more materials. Such materials may include any of a variety of thermoplastics, including acrylic, ABS, nylon, PLA, polybenzimidazole, polycarbonate, polyether sulfone, polyetherether ketone, polyetherimide, polyethylene, polyphenylene oxide, polyphenylene sulfide, polypropylene, polystyrene, PVC, and/or Teflon, one or more metals, including aluminum, iron, steel, brass, and/or chrome, and/or one or more composite materials including carbon, carbon fiber, and/or fiberglass. Such materials may include combinations of the previously listed materials. In some embodiments, the channel is comprised of powder-coated steel, the first device mount is comprised of ABS, and the second device mount is comprised of steel.

In some embodiments, the channel may be mounted overhead to one or more trusses, such as in a garage. The channel may be mounted directly to the trusses, or may be mounted to the trusses through a ceiling such as a drywall ceiling. The channel may be mounted to the ceiling by two lag bolts screwed into two truss beams. The lag bolts may pass through channel base openings. The channel may be mounted along a length of a single truss, perpendicular to a single truss, or perpendicular across two or more trusses. A significant problem in designing overhead mounting systems is the variability in inter-truss spacing. Depending on the type of construction and the builder, inter-truss spacing ranges, on average, from 16 inches to 24 inches. Thus, to capture at least a minimum of two trusses at the minimum average inter-truss spacing, the channel must have a length of at least 16 inches. Accordingly, the length of the channel may range from 16 inches to 48 inches in various embodiments. The channel may comprise a width ranging from half an inch to four inches, which may offer optimal proportions for mounting a plurality of devices to the channel. Another factor to consider when designing overhead mounting systems is the average number of devices a consumer will use and what inter-device spacing the average consumer will use.

The instant inventors have discovered an optimal channel length that balances the variability in inter-truss spacing and the variability in consumer usage is 30 inches. Accordingly, in various embodiments, the length of the channel is 30 inches. The instant inventors have also discovered an optimal number of spaces provided on each channel for accommodating devices and covers is five. Accordingly, in various embodiments, a length of the channel is five times a length of the cover. The device mounts may have a length shorter than the cover. For example, the device mounts may have a length ranging from one-third the channel length to one-tenth the channel length. In an optimal embodiment, the device mount length is equal to three-quarters the cover length. Accordingly, the channel length may be at least six-and-two-thirds times the device mount length, or the device mount length may be 0.15 times the channel length. A shorter device mount length than cover length may accommodate wiring that passes from the channel and connects to the device mounted by the device mount.

The channel may accommodate five covers consecutively, or the channel may accommodate four full covers and half each of two additional covers, the two halves accommodated at the channel ends. Similarly, the channel may accommodate five devices consecutively, or the channel may accommodate four full devices and half each of two additional devices, the two halves accommodated at the channel ends. Such may, for example, be an optimal arrangement in embodiments where two or more channels are aligned directly adjacent each other. In such embodiments, a cover or a device may be mounted across the seam between the two adjacent channels. The instant inventors have found that such an arrangement improves the weight distribution of devices across multiple channels.

The covers and device mounts may connect to the channel via the openings in the channel walls. The channel walls may be opposing, i.e., the channel walls may extend from the channel base on opposite sides of the channel base from each other. The walls each may include a plurality of openings. Opposing openings, i.e., openings on each wall across from each other, may be coaxial. The inter-opening length between adjacent openings along each channel wall may be uniform or non-uniform. A uniform spacing may simplify the manufacturing of device mounts and covers. However, a non-uniform spacing may provide an optimal arrangement that may allow devices to be placed adjacent to each other that may require more space between the openings in which the devices are mounted. In general, the inter-opening length may range from two inches to seven inches. In an optimal embodiment, the inter-opening length is three inches. In various embodiments, at least one of the openings may be spaced from at least one of the two opposing channel ends by half the inter-opening length. In embodiments where an adjacent channel has the same configuration, a device or cover may bridge the seam of the two channels.

The channel base may include a flat bar having a narrow width relative to its length. The length-to-width ratio may range from 6:1 to 48:1. The channel walls may extend from sides of the channel base along the length of the channel base. Each channel wall may form an angle with the channel base ranging from 45 degrees to 135 degrees, from 50 degrees to 130 degrees, from 60 degrees to 120 degrees, from 70 degrees to 110 degrees, from 80 degrees to 100 degrees, from 85 degrees to 95 degrees, from 89 degrees to 91 degrees, and/or 90 degrees. In some embodiments, the angle that each channel wall forms with the channel base may vary along the length of the channel. In some embodiments, the channel walls may extend from opposite sides of the channel base. The channel walls may similarly include flat bars having narrow widths relative to their lengths. The channel wall length-to-width ratio may range from 6:1 to 48:1. The channel ends may be formed of the end-edges of the channel base and the channel walls and may run along the widths of the channel base and the channel walls.

In some embodiments, the channel base and/or the channel walls may be contoured. The contouring may be along edges of the channel base and/or channel walls, and/or may be along surfaces of the channel base and/or channel walls. The contouring may correspond to contouring in a surface to which the channel may be mounted, or a surface against which the channel may rest.

The channel base may include one or more openings through which the channel base may be mounted to a surface. For example, one or more lag bolts, screws, and/or drywall fasteners may pass through the channel base openings. The channel base openings may have a larger diameter than the channel wall openings. The channel base openings may be spaced from each other by a channel base inter-opening length. The channel base inter-opening length may be shorter than the channel wall inter-opening length. The configuration of the channel openings may simplify installation by allowing a user to easily distinguish the channel base from the channel walls. Additionally, a closer channel base inter-opening spacing may more readily accommodate a variety of inter-truss spacings. The instant inventors have discovered that a ratio of three channel base openings for every two channel wall openings is optimal to balance the variability in inter-truss spacing and the variability in how consumers typically use the channel. Accordingly, the channel may include three channel base openings for every two channel wall openings.

The first device mount may be detachable from a corresponding light-weight device and detachably connected to the channel, such as by two or more detents disposed in at least two of the coaxial opposing openings. For example, the first device mount may include two opposing walls complementary to the channel walls. A width extending between inner surfaces of the device mount walls may be equal to, or may exceed by a slight fraction, the width extending between outer surfaces of the channel walls. Alternatively and/or additionally, a width extending between outer surfaces of the device mount walls may be equal to, or shy of, the width extending between inner surfaces of the channel walls. The detents may be disposed on the opposing device mount walls, and may extend inwards or outwards into the opposing coaxial openings.

The first device mount may, in various embodiments, include one or more device-coupling elements that detachably couple the device mount directly to the corresponding light-weight device. Such device-coupling elements may include, for example, one or more key slot posts. The light-weight device may include one or more key slots corresponding to the one or more key slot posts. This particular configuration has the benefit of flexibility for the manufacturer and/or retailer of the device: the device may be purchased without purchasing the track and device mount, and may be mounted to a surface using one or more screw heads protruding from the surface. In some embodiments, the device-coupling elements may include one or more permanent magnets, ferromagnetic materials, or both, disposed in the device mount. The light-weight device may include one or more permanent magnets, ferromagnetic materials, or both, complementary to the device coupling element. For example, the device mount may include a permanent magnet, such as integrated into the base of the device mount, and the light-weight device may include a ferromagnetic plate, such as a steel plate integrated into the device case.

The second device mount may be integral with a corresponding heavy-weight device. The second device mount may be detachably connected to the channel, such as by one or more rods passing through at least two of the coaxial opposing openings. In various embodiments, the second device mount may include at least two opposing walls complementary to the channel walls. The device mount walls may include at least two coaxial openings complementary to the channel wall coaxial openings. The rod may pass through the device mount wall coaxial openings and the opposing channel wall coaxial openings.

The light-weight device may include various devices having weights ranging from one ounce to 10 pounds. The maximum amount of weight supportable by the first, light-weight device mount may correspond to a rigidity of the material forming the device mount. A plastic ABS light-weight device mount may have a lower weight threshold than a steel light-weight device mount. The light-weight device may include a housing. Various housing configurations may allow for devices made by other manufacturers to be mounted to the channel. For example, a housing having a shape corresponding to an Echo Dot, manufactured by Amazon, may allow the Echo Dot to be mounted to the channel. The housing may be removable, and may detachably connect directly to the first device mount. In various embodiments, the light-weight device may include an artificial intelligence hub, such as the Amazon Echo or the Google Home, a light, a speaker, a backup battery, a laser position sensor (such as those used for parking cars in home garages), and/or a device use notification hub, among others.

The heavy-weight device may include a variety of devices, such as a motorized lifter, an overhead-mounted inflator, and/or a power cord reel, among others. Such devices may have a weight ranging from greater than or equal to five pounds, and/or may further support additional weight ranging up to 200 pounds. Accordingly, the second device mount may support a weight ranging from five pounds to 200 pounds. For example, the device may be a lifter. The lifter may weight five pounds, and may be capable of lifting up to 100 pounds. As another example, the device may be an inflator. The inflator may weigh 10 pounds, and, as a user pulls on an air hose reeled on the inflator, the force on the second device mount may increase to fifteen pounds, which force may depend on the friction in the reel of the inflator.

Because the second device mount is integrated with the heavy-weight device, a separate wall mount may be required in embodiments where the heavy-weight device is mounted to a surface without the channel. Accordingly, a bracket may be provided that mounts directly to the channel, and to which the second device mount directly connects. In various embodiments, the bracket may include a base having one or more openings corresponding to one or more lag screws, and two or more opposing fins extending from the base. The opposing fins may include coaxial opposing openings. The rod may pass through the coaxial openings in the device mount walls and the coaxial openings in the fins. The lag screws may be screwed into a solid surface, such as a wooden beam, which may secure the bracket to the surface.

Some embodiments of the system described above are depicted in the appended FIGs. and described below regarding those FIGs.

Figure 1B:
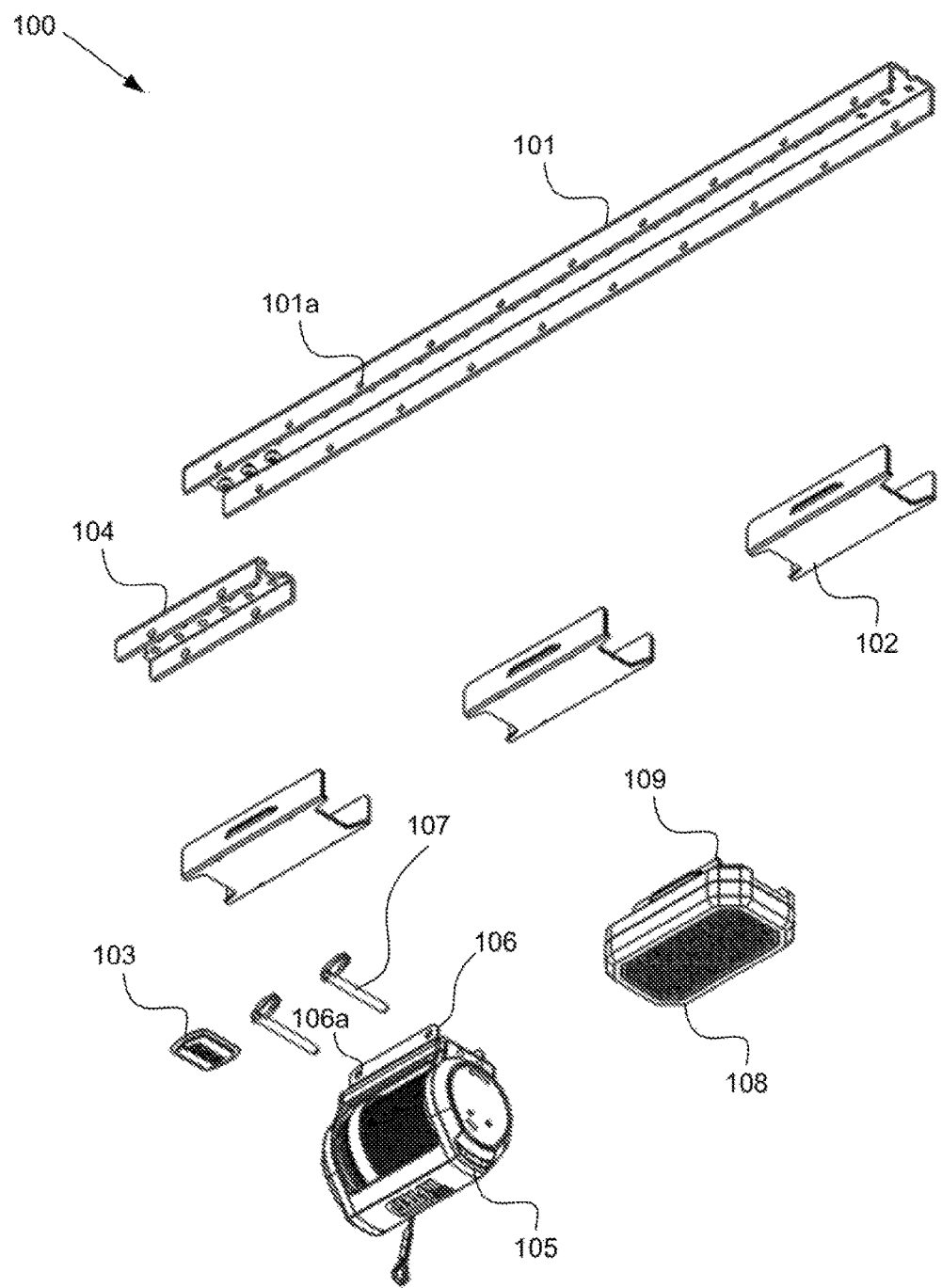

FIGS. 1A-B depict two views of an overhead mounting system. FIG. 1A depicts an isometric view. FIG. 1B depicts a partially exploded view to show additional detail. The overhead mounting system 100 includes a u-shaped channel 101, a set of three u-shaped covers 102, a cover spacer 103, a channel bridge 104, a compact motorized lifter 105 mounted to the channel by a heavy-weight device mount 106, device mount rods 107, and a speaker 108 mounted to the channel by a light-weight device mount 109. The covers and device mounts directly mount to the channel. The device mount rods pass through coaxial openings 106a in the heavy-weight device mount walls and coaxial openings 101a in the channel walls.

Figure 2:
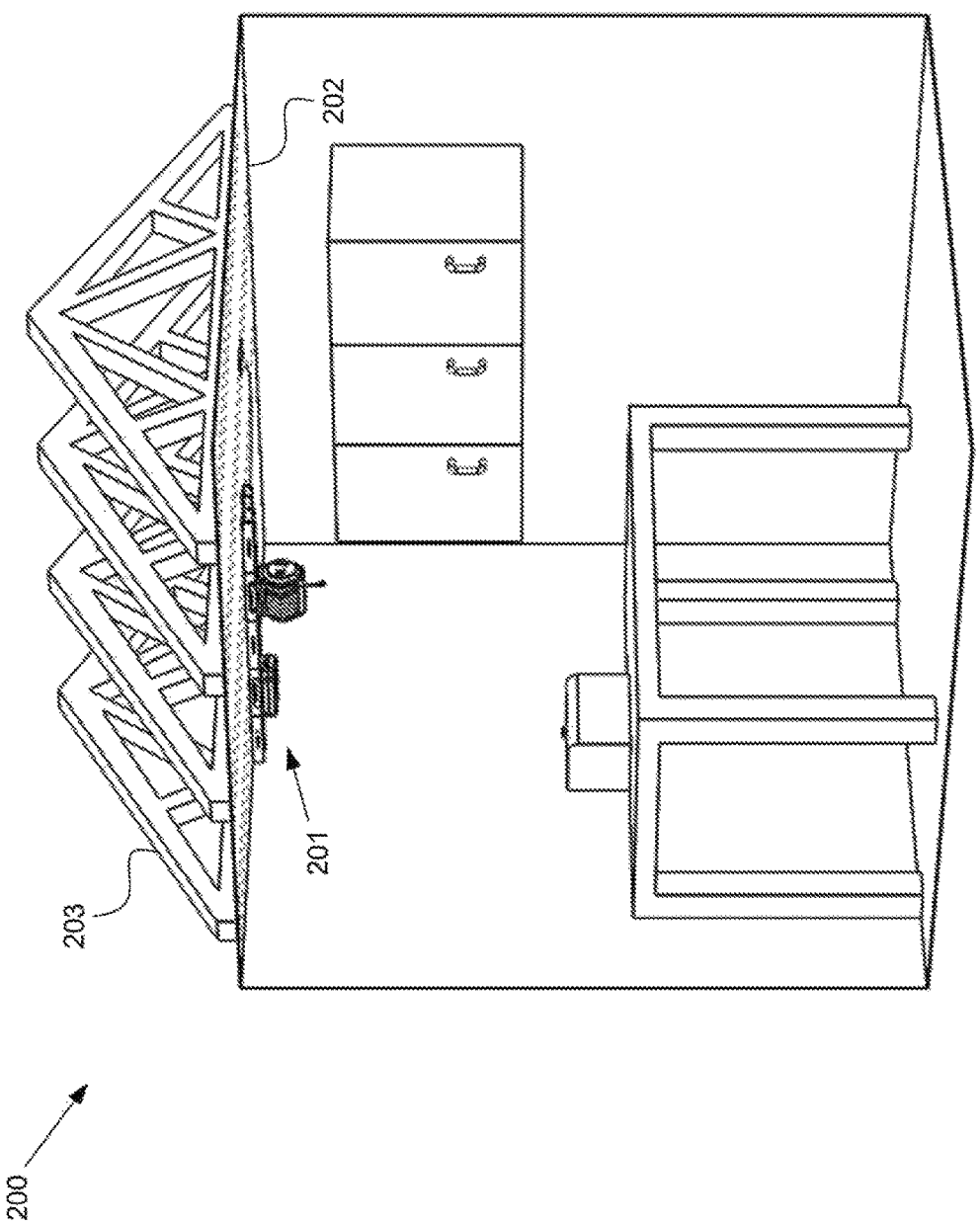
FIG. 2 depicts an isometric view of an overhead mounting system mounted to a ceiling of a garage.

FIG. 2 depicts an isometric view of an overhead mounting system mounted to a ceiling of a garage. The overhead mounting system 201 is mounted to the ceiling 202 by lag bolts screwed into trusses 203. The overhead mounting system spans across two trusses.

Figure 3:
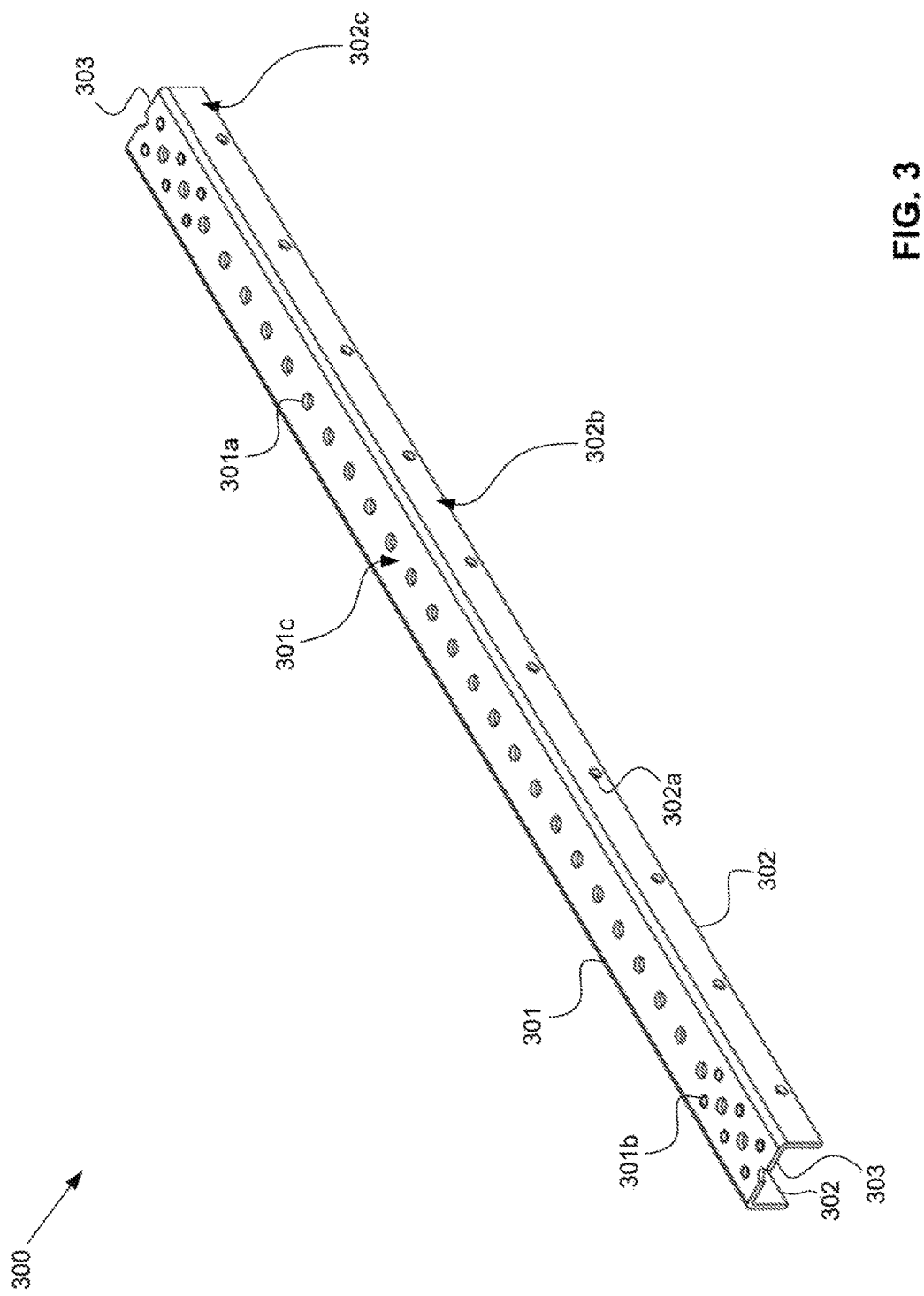
FIG. 3 depicts a top-isometric view of a u-shaped channel for use in embodiments of the overhead mounting system described herein.

FIG. 3 depicts a top-isometric view of a u-shaped channel for use in embodiments of the overhead mounting system described herein. The channel 300 includes a channel base 301, a plurality of channel base openings 301a, a plurality of channel bridge openings 301b, two channel walls 302, a plurality of coaxial channel wall openings 302a, and two channel ends 303. Each channel base opening is spaced from its neighboring channel base openings by a channel base inter-opening length 301c. Each channel wall opening is spaced from its neighboring channel wall openings by a channel wall inter-opening length 302b. Two channel wall openings are spaced from the channel ends by half the channel wall inter-opening length 302c.

Figure 4A:
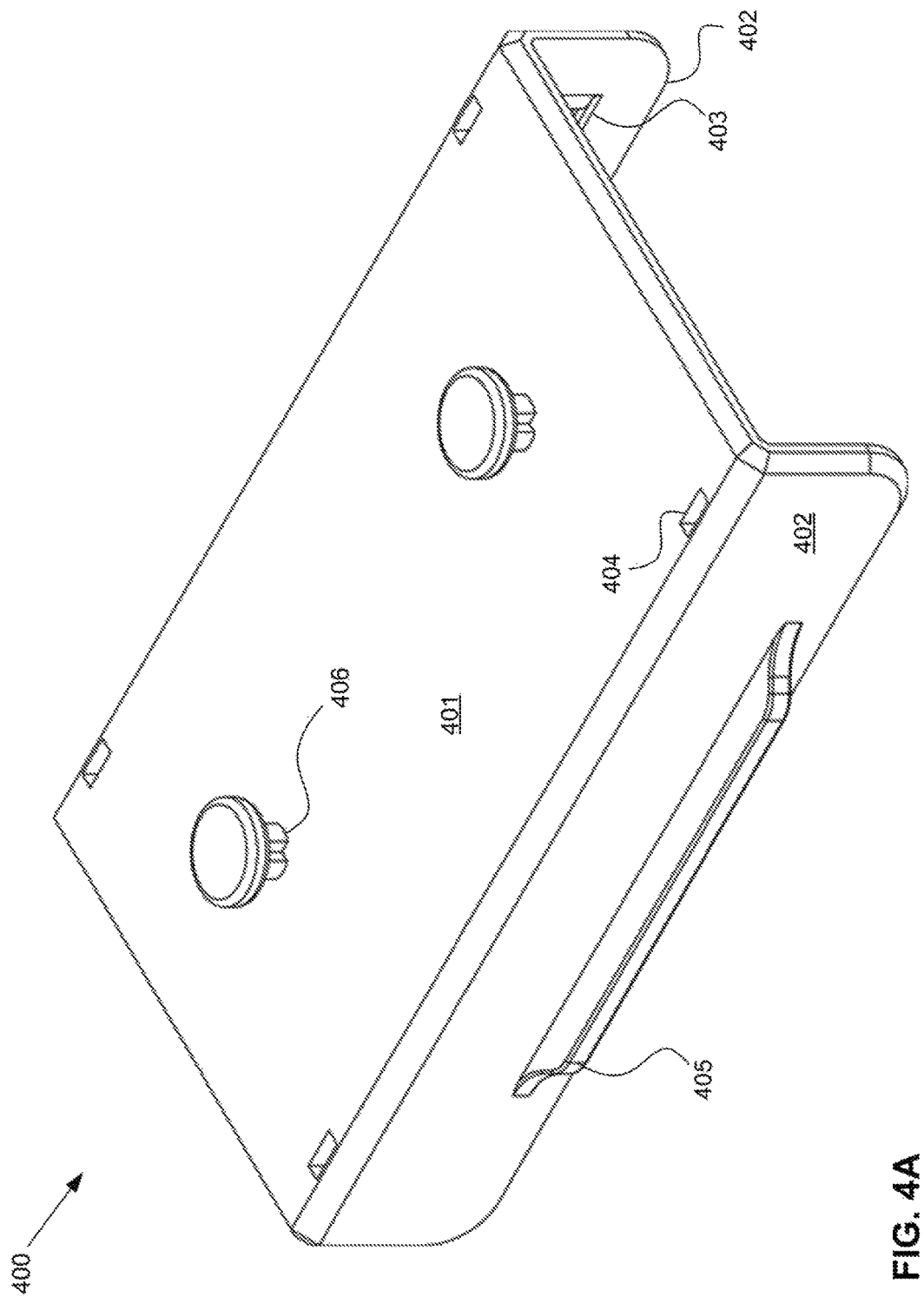
Figure 4B:
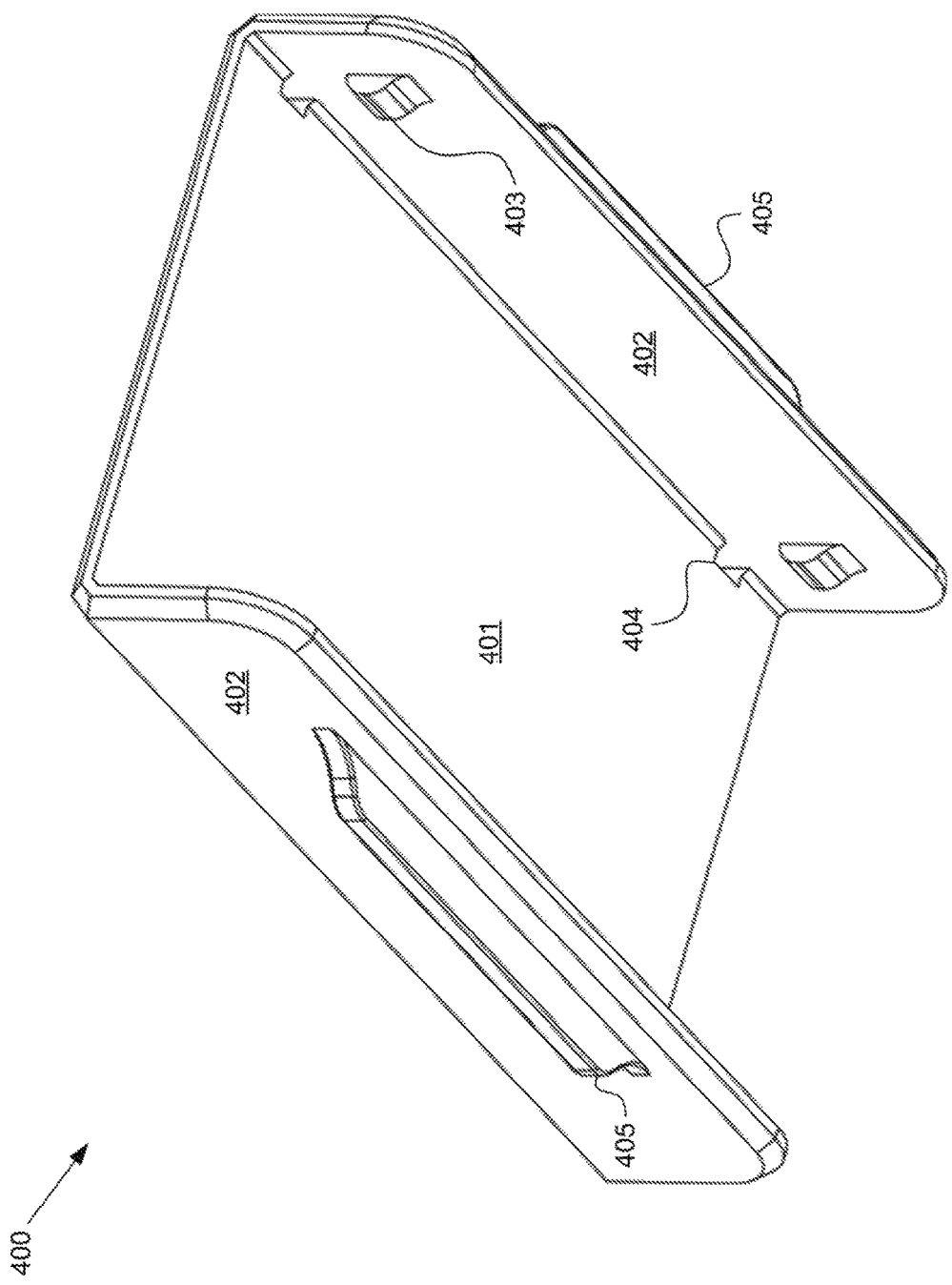

FIGS. 4A-C depict various views of a light-weight device mount. The light-weight device mount 400 includes a base 401, two opposing walls 402 extending perpendicularly from the base, inward-protruding detents 403 connected directly to the walls, injection-molding openings 404 corresponding to each detent, grasping flanges 405 protruding outwards from the walls, and key slot posts 406 extending perpendicularly from the base. The prongs extend from the base in a direction opposite the walls. The injection molding openings allow for the detents to be formed on the walls using an injection molding process.

Figure 5:
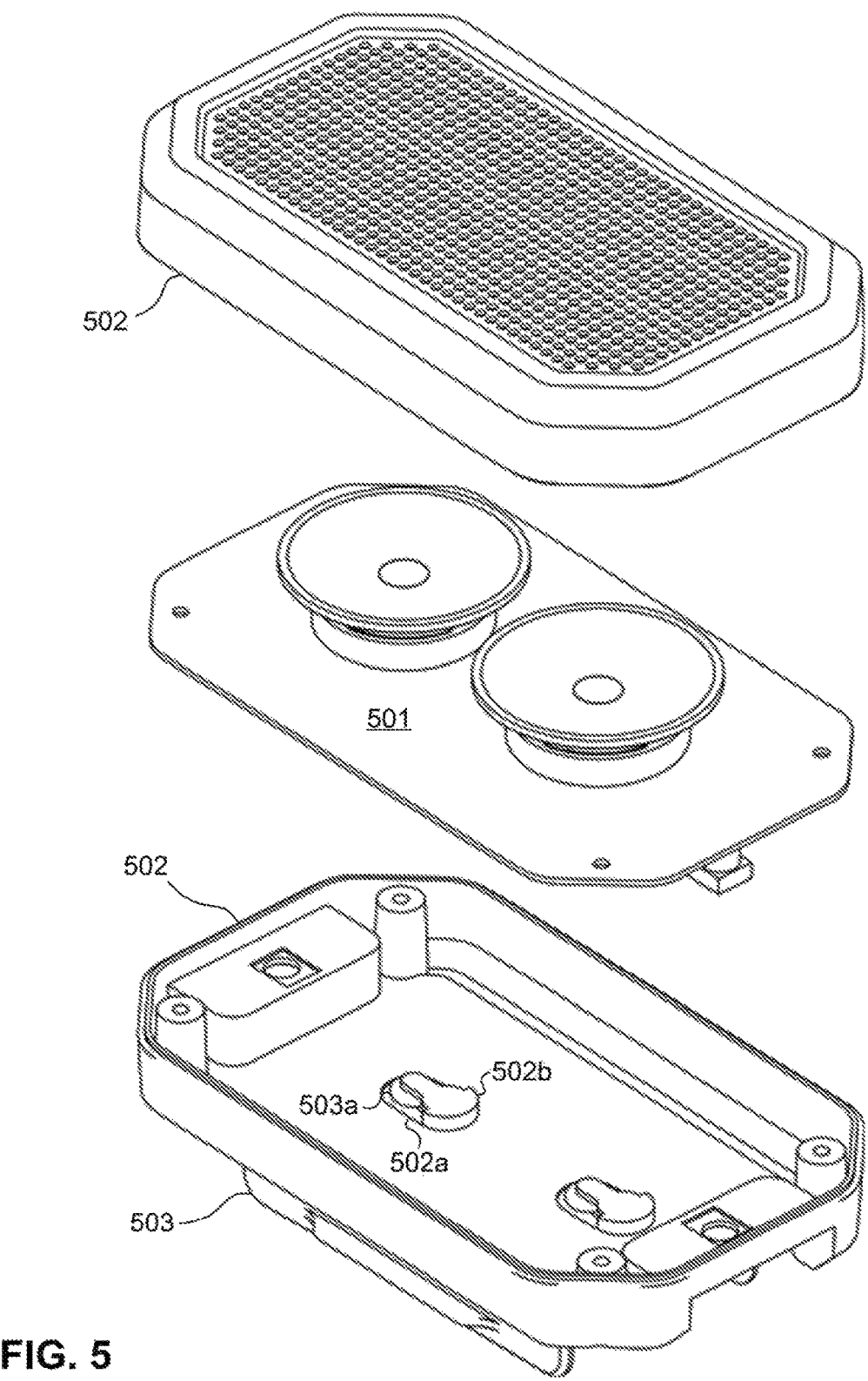
FIG. 5 depicts an exploded view of a light-weight device.

FIG. 5 depicts an exploded view of a light-weight device. A speaker 501 fits in a housing 502. The housing is connected to a light-weight device mount 503. The housing includes key slots 502a and key slot backings 502b, and the device mount includes key slot posts 503a. The key slot backings may prevent the key slot posts from scraping and/or rubbing against a speaker housed within the housing.

Figure 6:
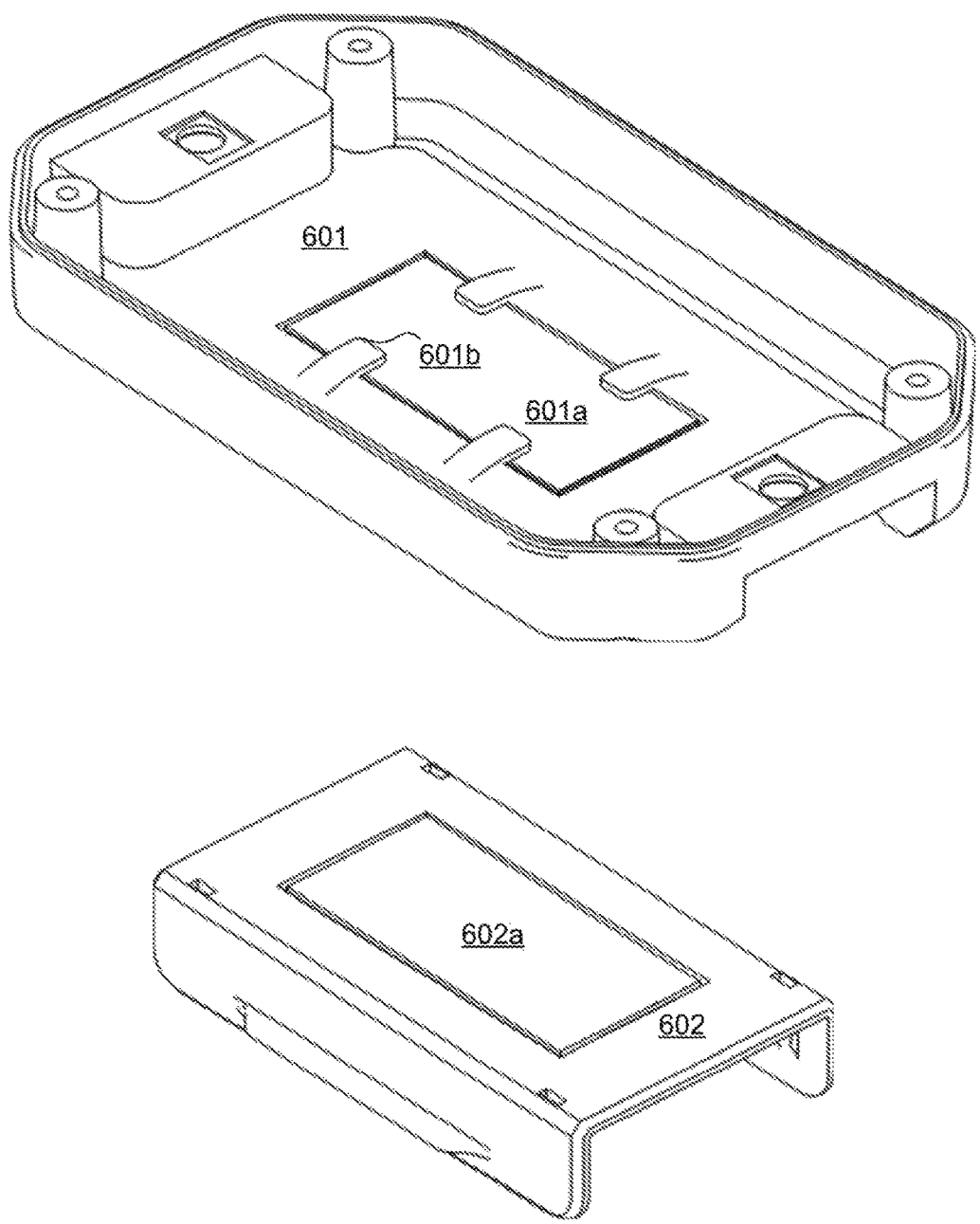
FIG. 6 depicts another embodiment of a light-weight device mount housing.

FIG. 6 depicts another embodiment of a light-weight device mount housing. The housing 601 connects to a light-weight device mount 602. The housing includes a metal plate 601a secured in the housing by tabs 601b. The device mount includes a permanent magnet 602a. A force exerted between the magnet and the plate connects the housing to the device mount.

Figure 7A:
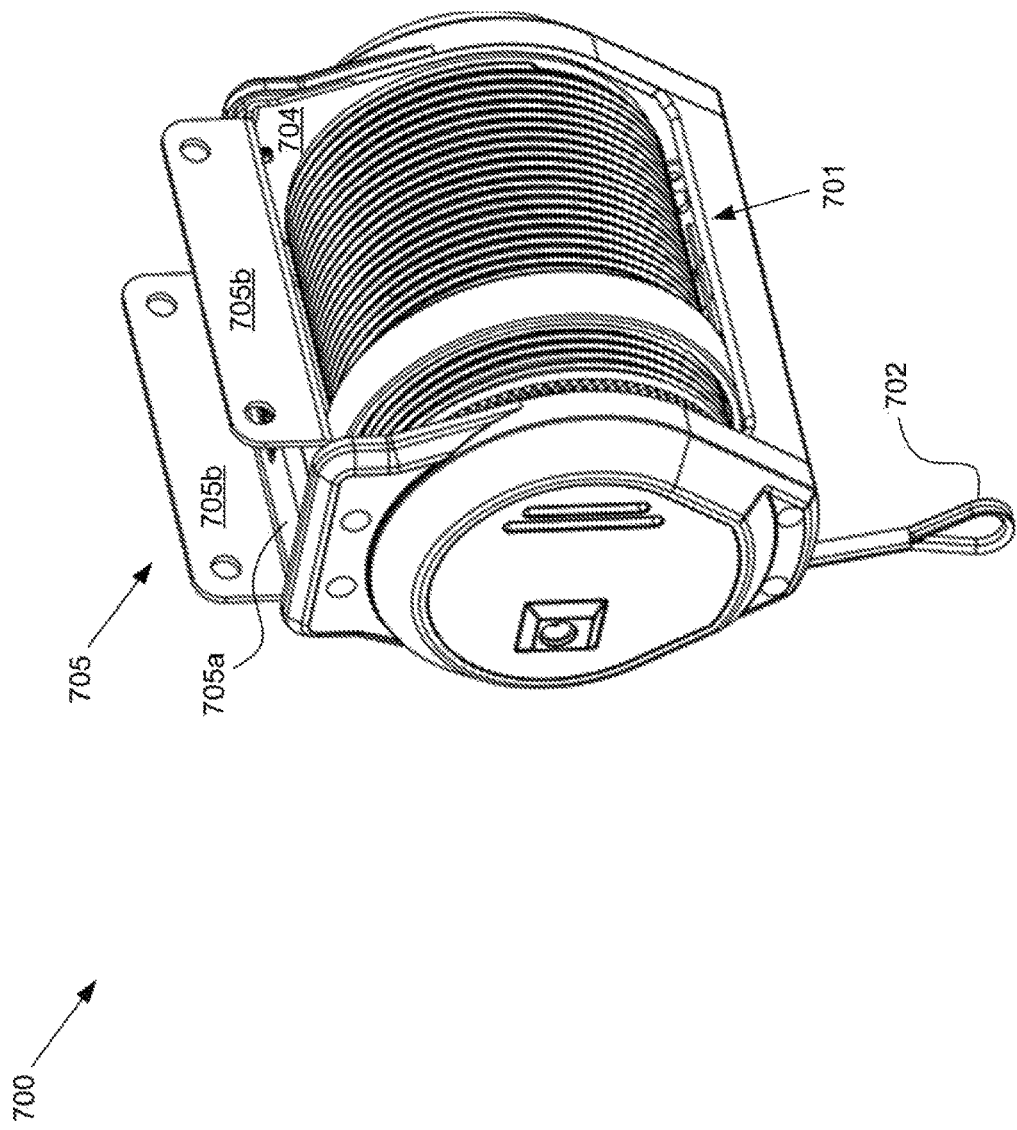
FIGS. 7A-B depict two views of a compact motorized lifter.
Figure 7B:
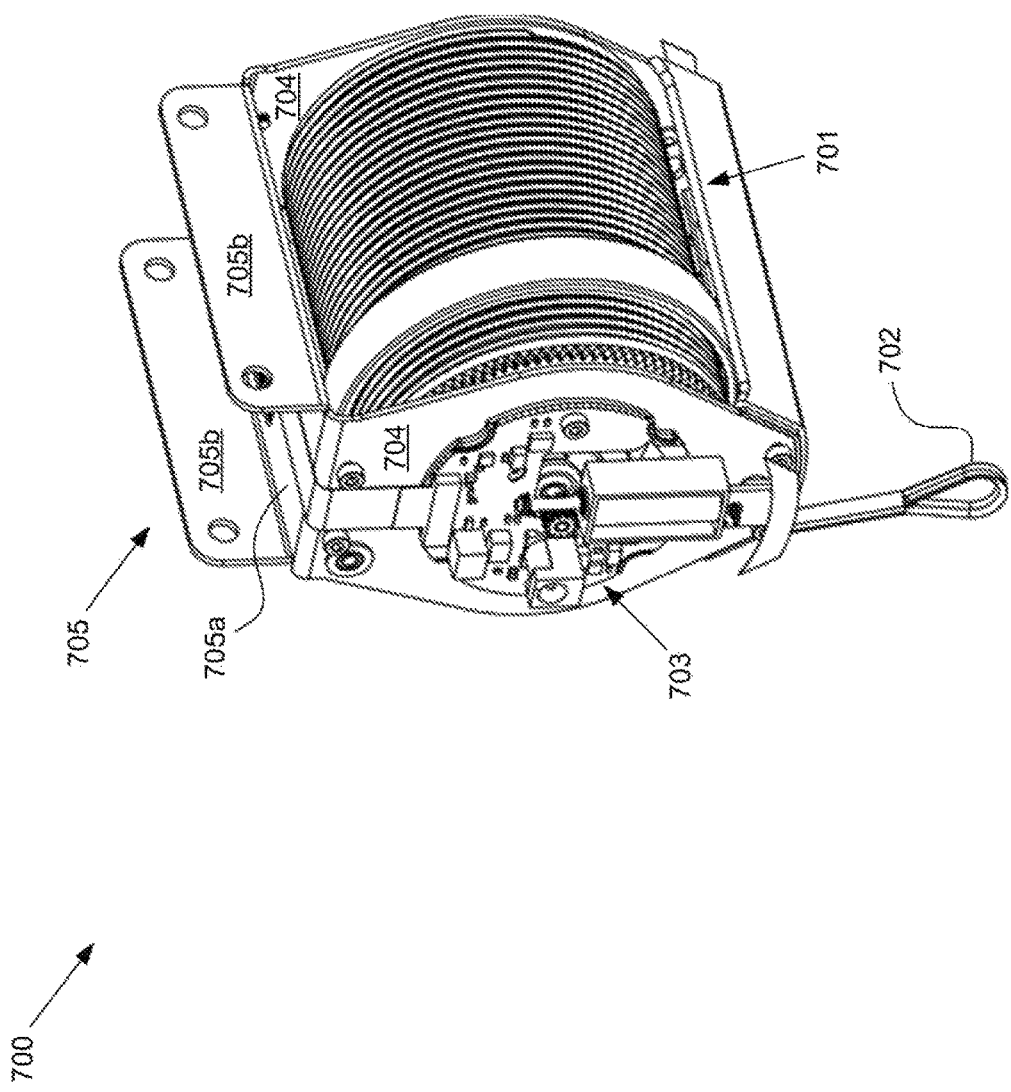

FIGS. 7A-B depict two views of a compact motorized lifter. The lifter 700 includes a drum 701, a cord 702, power and control electronics 703, support brackets 704, and a heavy-weight device mount 705. The support brackets support the drum and the electronics and enable rotation of the drum. The device mount includes a base 705a and two opposing walls 705b extending perpendicularly from the base. The base is monolithic with the support brackets.

Figure 8:
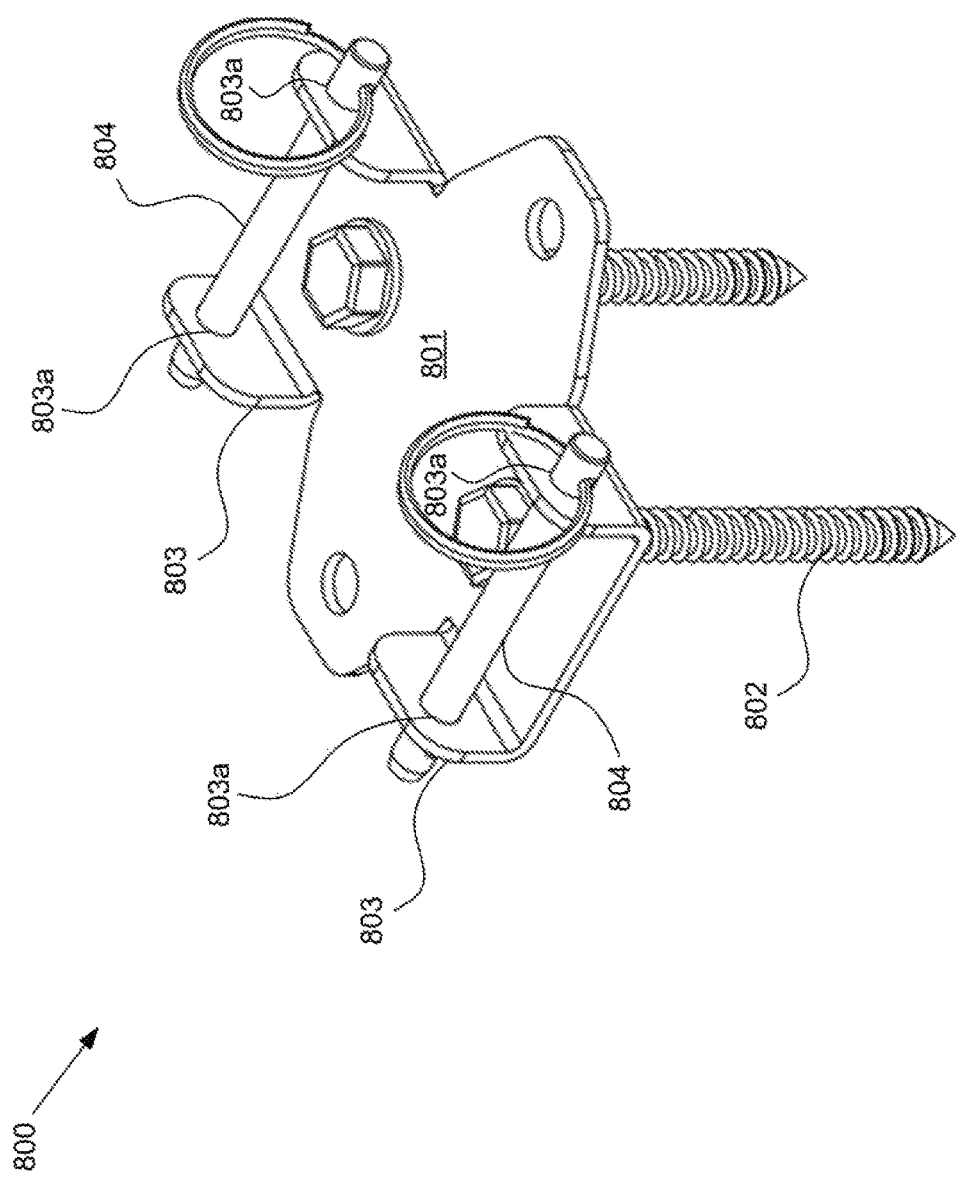
FIG. 8 depicts an isometric view of a wall bracket.

FIG. 8 depicts an isometric view of a wall bracket. The wall bracket 800 includes a base 801, lag screws 802, fins 803 with coaxial openings 803a, and device mount rods 804. The device mount rods pass through the openings in the fins and coaxial openings in a device mount to mount a device mount to the wall bracket. The lag screws mount the wall bracket to a surface.

We claim:

1. An overhead mounting system, comprising:
a channel comprising a base and at least two opposing walls fixed to, and extending from, the base, wherein the walls each comprise a plurality of openings, wherein opposing openings are coaxial;
a first device mount comprising at least two opposing walls complementary to the at least two opposing channel walls detachable from a device and detachably connected to the channel by two or more detents disposed in at least two of the coaxial opposing openings, and
a second device mount comprising at least two opposing walls complementary to the at least two opposing channel walls detachable from a device and detachably connected to the channel by one or more rods passing through at least two of the coaxial opposing openings.

2. The overhead mounting system of claim 1, wherein the channel comprises a length ranging from 16 inches to 48 inches.

3. The overhead mounting system of claim 2, wherein one or more of the first device mount and the second device mount comprise a length ranging from one-third the channel length to one-tenth the channel length.

4. The overhead mounting system of claim 1, wherein the channel comprises a length of 30 inches.

5. The overhead mounting system of claim 4, wherein one or more of the first device mount and the second device mount comprise a length of 0.15 times the channel length.

6. The overhead mounting system of claim 1, wherein the channel comprises a width ranging from half an inch to four inches.

7. The overhead mounting system of claim 1, the channel comprising a uniform inter-opening length.

8. The overhead mounting system of claim 7, wherein the inter-opening length ranges from two inches to seven inches, or wherein the inter-opening length is three inches.

9. The overhead mounting system of claim 8, the channel further comprising at least two opposing ends, at least one of the openings spaced from at least one of the ends by half the inter-opening length.

10. The overhead mounting system of claim 1, wherein the detents are disposed on the opposing device mount walls.

11. The overhead mounting system of claim 1, wherein the second device mount walls comprise at least two coaxial openings complementary to the channel wall coaxial openings.

12. The overhead mounting system of claim 11, wherein the rod passes through the second device mount wall coaxial openings.

13. The overhead mounting system of claim 1, wherein the first device mount comprises one or more device-coupling elements.

14. The overhead mounting system of claim 13, wherein the device-coupling elements comprise one or more key-slot posts.

15. The overhead mounting system of claim 14, wherein the device comprises one or more key slots corresponding to the one or more key-slot posts.

16. The overhead mounting system of claim 13, wherein the device-coupling elements comprise one or more permanent magnets, ferromagnetic materials, or both.

17. The overhead mounting system of claim 16, wherein the device comprises one or more permanent magnets, ferromagnetic materials, or both, complementary to the device-coupling element.

18. The overhead mounting system of claim 1, wherein the device comprises a removable housing, wherein the removable housing detachably connects to the first device mount.

* * * * *